US012783812B2

(12) United States Patent
Tagliasacchi et al.

(10) Patent No.: US 12,783,812 B2
(45) Date of Patent: Nov. 3, 2026

(54) MIDSTREAM PROCESSING OF STREAMING INPUT TO GENERATE STREAMING OUTPUT

(71) Applicant: GDM Holding LLC, Mountain View, CA (US)

(72) Inventors: Marco Tagliasacchi, Ruvigliana (CH); Matthew Sharifi, Kilchberg (CH); Emmanuel Orsini, Paris (FR); Zalan Borsos, Zurich (CH); Damien Vincent, Zurich (CH); Oleg Rybakov, Redmond, WA (US)

(73) Assignee: GDM Holding LLC, Mountain View, CA (US)

( * ) Notice: Subject to any disclaimer, the term of this patent is extended or adjusted under 35 U.S.C. 154(b) by 114 days.

(21) Appl. No.: 18/614,354

(22) Filed: Mar. 22, 2024

(65) Prior Publication Data

US 2025/0298981 A1 Sep. 25, 2025

(51) Int. Cl.
*G06F 40/00* (2020.01)
*G06F 40/30* (2020.01)
(Continued)

(52) U.S. Cl.
CPC .............. *G06F 40/30* (2020.01); *G10L 15/02* (2013.01); *G10L 15/1815* (2013.01); *G10L 2015/025* (2013.01)

(58) Field of Classification Search
CPC .. G06F 40/211; G06F 40/40253; G06F 40/58; G06F 40/268; G06F 40/284; G06F 40/30; G06F 40/55; G06N 3/09; G06N 3/0455; G06N 3/0475; G10L 15/16; G10L 19/005; G10L 19/00; G10L 25/27;
(Continued)

(56) References Cited

U.S. PATENT DOCUMENTS 10,699,700 B2 * 6/2020 Qian .................... G10L 15/063
11,915,689 B1 * 2/2024 Agostinelli ............ G10L 15/16
(Continued)

OTHER PUBLICATIONS

Borsos, et al., "AudioLM: a Language Modeling Approach to Audio Generation" arXiv:2209.0314v2 [cs.SD], 11 pages, dated Jul. 26, 2023.
(Continued)

*Primary Examiner* — Vu B Hang
(74) *Attorney, Agent, or Firm* — Gray Ice Higdon

(57) ABSTRACT

Implementations are described herein for processing a stream of time-varying input data to generate/predict a stream of time-varying output data in real-time or near-real time. In various implementations, while a stream of input frames, such as a stream of audio input frames, is received, audio input frames received up to a current time step may be tokenized (e.g., midstream) to generate a stream of audio input tokens. A Transformer-based causal attention model may be used to predict a stream of audio output tokens, e.g., by iteratively applying the Transformer-based causal attention model to: at least some of the audio input tokens tokenized up to the current time step, and at least some of the audio output tokens predicted up to the current time step. The stream of audio output tokens may be detokenized to generate a stream of audio output frames.

20 Claims, 8 Drawing Sheets

(51) Int. Cl.
*G10L 15/02* (2006.01)
*G10L 15/18* (2013.01)

(58) Field of Classification Search
CPC ....... G10L 25/30; G10L 15/02; G10L 15/063; G10L 15/12; G10L 15/07; G10L 15/20; G10L 15/22; G10L 15/26; G10L 15/30; G10L 15/1822; G10L 15/183; G10L 15/193; G10L 15/19; G10L 13/00; G10L 13/04; G10L 13/08; G10L 13/10; G10L 13/07; G10L 15/1815
See application file for complete search history.

(56) References Cited

U.S. PATENT DOCUMENTS

| | | | | |
|---|---|---|---|---|
| 11,915,690 | B1 * | 2/2024 | Chang | G10L 19/008 |
| 12,182,506 | B2 * | 12/2024 | Saxena | G06F 40/20 |
| 12,390,724 | B2 * | 8/2025 | Chintalapudi | A63F 13/358 |

OTHER PUBLICATIONS

Neil et al., “SoundStream: An End-to-End Neural Audio Codec” arXiv:2107.03312v1 [cs.SD], 12 pages, dated Jul. 7, 2021.
European Patent Office, Communication issued in Application No. 25164789.7, 8 pages, dated Aug. 4, 2025.
Wang, et al., StreamVoice: Streamable Context-Aware Language Modeling for Real-time Zero-Shot Voice Conversion, 11 pages, dated Jan. 23, 2024.
Jenrungrot, T. et al., LMCodec: A Low Bitrate Speech Codec With Causal Transformer Models, 5 pages, dated Mar. 23, 2023.

* cited by examiner

700

MIDSTREAM PROCESSING OF STREAMING INPUT TO GENERATE STREAMING OUTPUT

BACKGROUND

Generative audio models may be applied to a conditioning signal as input to generate audio as output. Depending on the use case, the conditioning signal may assume different forms, such as text, audio, other modalities (e.g., images or videos), or any combination thereof. Some non-limiting examples of conditioning signals include text descriptions for text-to-audio or text to music generation, source speech for speech-to-speech translation, text transcripts and speech prompt(s) for voice-controlled text-to-speech synthesis, etc.

SUMMARY

In the aforementioned examples, the generative model is applied to the entire input conditioning signal (e.g., logically self-contained or standalone) to generate corresponding output. For example, an automated assistant may wait to respond to a user's utterance until the user completes their utterance, at which point the entire user utterance is available for processing. However, there are a number of use cases in which the conditioning signal may take the form of a time-varying input stream that is only revealed incrementally to the generative audio model.

Some non-limiting examples include use cases in which the input represents audio (or video) captured in real-time, or user instructions continuously updated via a human-computer interface (HCI). These use cases, some of which may benefit from real-time, low-latency generation, may include: speech-to-speech translation, in which the source speech is translated to the target language; speech enhancement, in which the input voice is restored to improve intelligibility; dialogue agents, in which a system is able to interact with the user via a speech-only interface; and controllable music generation, in which music is generated on-the-fly, based on a time-varying input (which can assume different forms, such as melody, rhythm, chord progression, etc.).

It is possible to process time-varying input conditioning signals by applying a generative model in a windowed fashion. Every time the input conditioning signal changes, a new audio segment may be produced using the previously generated audio as additional conditioning to enable smooth transitions. While this approach addresses cases in which the input conditioning signal is slowly adapted over time (e.g., every few seconds, as for story mode used in both music and video generation), it may be less suitable whenever the input conditioning is fast paced, e.g., when is it sampled more frequently (e.g., every few milliseconds).

Implementations are described herein for processing a stream of input data to generate/predict a stream of output data in real-time or near-real time. More particularly, but not exclusively, techniques are described herein for tokenizing a stream of audio input frames to generate a stream of audio input tokens, using a Transformer-based causal attention model to predict a stream of audio output tokens, and detokenizing the stream of audio output tokens to generate a stream of audio output frames.

In various implementations, the method may include: receiving a stream of audio input frames; while the stream of audio input frames is received, tokenizing audio input frames received up to a current time step to generate a stream of audio input tokens; using a Transformer-based causal attention model to predict a stream of audio output tokens, wherein using the Transformer-based causal attention model comprises iteratively applying the Transformer-based causal attention model to: at least some of the audio input tokens tokenized up to the current time step, and at least some of the audio output tokens predicted up to the current time step; and detokenizing the stream of audio output tokens to generate a stream of audio output frames.

In various implementations, the method may include mixing audio input tokens of the stream of audio input tokens with at least some of the audio output tokens predicted up to the current time step to generate a mixed stream of audio tokens. In various implementations, the mixed stream of audio tokens may be iteratively processed using the Transformer-based causal attention model. In various implementations, the mixing may include interleaving audio input tokens of the stream of audio input tokens with at least some of the audio output tokens predicted up to the current time step. In various implementations, the Transformer-based causal attention model may be a decoder-only transformer.

In various implementations, the Transformer-based causal attention model may include an encoder transformer and a decoder transformer operably coupled using cross attention. In various implementations, the decoder transformer attends to audio output tokens of the stream of audio output tokens. In various implementations, the encoder transformer attends to audio input tokens of the stream of audio input tokens.

In various implementations, the Transformer-based causal attention model may use local attention, e.g., a local attention kernel. In various implementations, the method may include adjusting a future context length of the local attention kernel to add a controllable lookahead.

In various implementations, the stream of audio input tokens may include at least some acoustic input tokens generated using a neural audio codec. In various implementations, the stream of audio input tokens may further include at least some semantic input tokens generated using a semantic tokenizer that is trained to capture, in the audio input tokens, semantic features of the audio input frames. In various implementations, each of the audio input tokens may include both an acoustic input token and a semantic input token. In various implementations, each of the audio output tokens comprises both a predicted acoustic output token and a predicted semantic output token, and the detokenizing may include decoding the predicted acoustic output token, without decoding the predicted semantic output token.

In various implementations, the Transformer-based causal attention model may include a first model used to process the at least some of the audio input tokens tokenized up to the current time step at least some of the audio output tokens predicted up to the current time step to generate coarse acoustic tokens, and a second model to process the coarse acoustic tokens to generate fine acoustic tokens.

In various implementations, the semantic features may include one or more of: phonetic features of the audio input frames; prosodic features of the audio input frames; melodic features of the audio input frames; or rhythmic features of the audio input frames. In various implementations, during each iteration of the Transformer-based causal attention model, the Transformer-based causal attention model may be applied to: a current audio state, wherein the current audio state was generated autoregressively based on one or more prior iterations of the Transformer-based causal attention model to prior audio input tokens; and one or more next audio input tokens.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
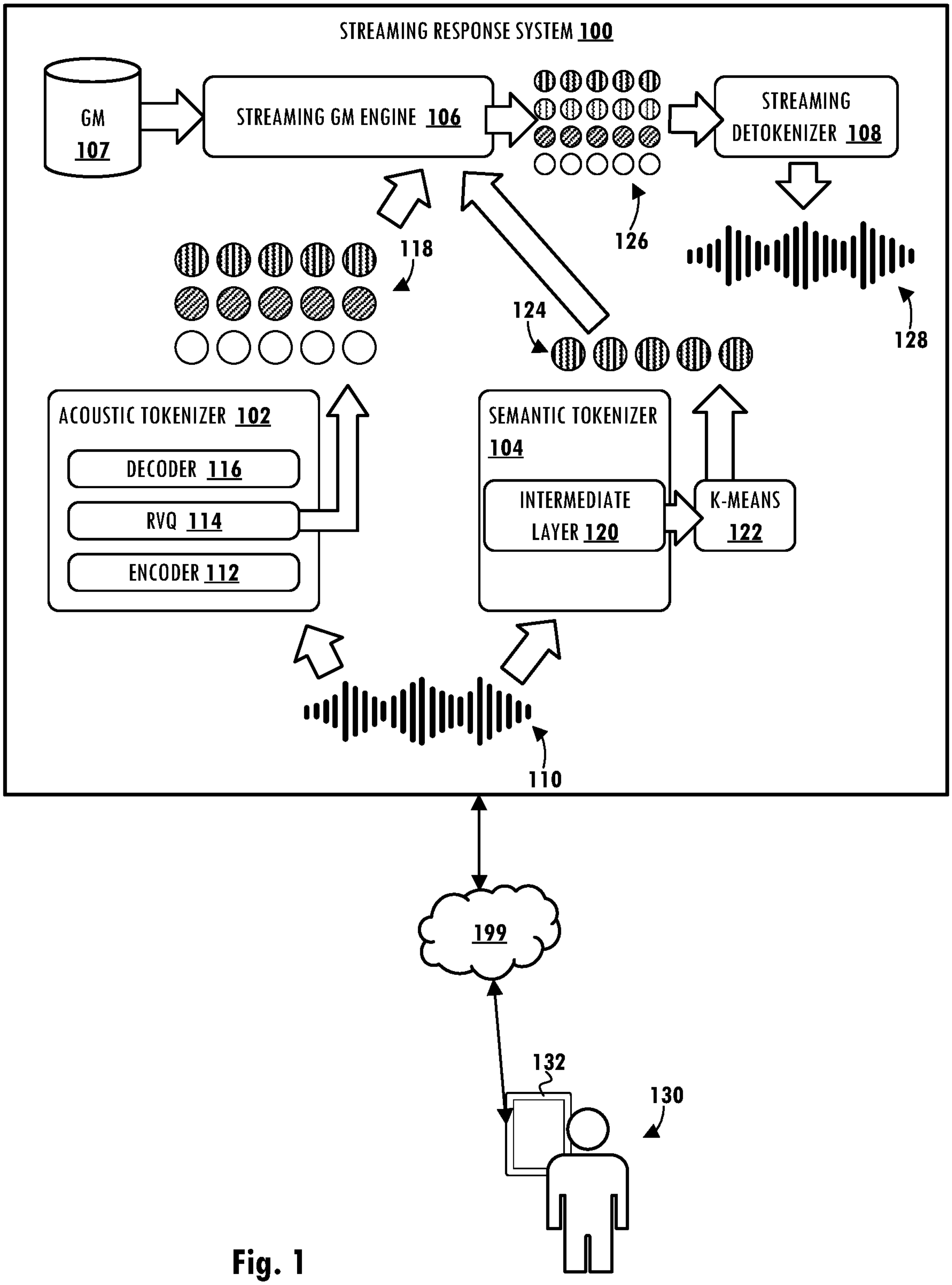
FIG. 1 schematically depicts an example environment in which disclosed techniques may be employed, in accordance with various implementations.

Implementations are described herein for processing a stream of input data to generate/predict a stream of output data in real-time or near-real time. More particularly, but not exclusively, techniques are described herein for tokenizing a stream of audio input frames to generate a stream of audio input tokens, using a Transformer-based causal attention model to predict a stream of audio output tokens, and detokenizing the stream of audio output tokens to generate a stream of audio output frames.

In various implementations, audio in an environment may be captured as an analog audio waveform representing detected changes in pressure waves in the environment. The audio waveform may be converted to a digital signal using an analog-to-digital converter (ADC). In some implementations, the digital signal may be organized into temporal audio input frames. For instance, the audio waveform may be sampled at some frequency, e.g., 24 kHz, and audio input frames of N samples may be sampled, with each audio input frame representing some time interval of audio.

In some implementations, each audio input frame may be tokenized, e.g., by an audio tokenizer, into an audio input token, which may or may not take the form of an embedding. Once tokenized, the audio input tokens may be processed using the aforementioned Transformer-based causal attention model to predict a stream of audio output tokens. The Transformer-based causal attention model may take various forms, such as a decoder-only transformer, an encoder transformer coupled with a decoder transformer via cross attention, or even an encoder-only transformer in some use cases. In various implementations, the stream of audio output tokens may then be detokenized, e.g., by an audio detokenizer, to generate, for instance, a stream of audio output tokens. These audio output tokens may then be used to render audio output at audio output device(s) (e.g., speakers).

Techniques described herein may facilitate generation of time-varying output in real-time or near real-time based on streams of time-varying (e.g., audio) input. To this end, in various implementations, the constraint of "causality" may be enforced on various components mentioned previously, such as the audio tokenizer, the Transformer-based causal attention model, and/or the audio detokenizer. "Causality" may refer to the component only having access to past information, e.g., during training and/or during inference. In some implementations, however, the causality constraint may be relaxed by introducing a controllable amount of lookahead, at the potential cost of introducing latency.

Moreover, various components such as those mentioned above may be configured to handle input streams (audio or otherwise) of arbitrary lengths. In some implementations, computations may be performed using a relative, rather than absolute, temporal axis. In some implementations, a stateless Transformer-based causal attention model may be configured to operate on consecutive overlapping audio segments (e.g., groups of audio input tokens). However, to conserve computational costs, in other implementations, a stateful Transformer-based causal attention model may be configured to process, at each iteration, (i) a current state and (ii) a next audio input token, to predict a next audio output token.

To process a stream of input data (e.g., audio) in real time or near real time, the Transformer-based causal attention model may be applied to various input data, iteration after iteration as the input data becomes available (e.g., up to a current time step), to predict the stream of output tokens. The data to which the Transformer-based causal attention model may be applied may include, for instance, at least some audio input tokens that are tokenized up to a current time step, and at least some audio output tokens that were predicted up to (e.g., prior to) the current time step. In some implementations, the Transformer-based causal attention model may be configured with one or more local attention kernels (e.g., with relatively short context lengths) that processes a relatively small number of audio input tokens and/or audio output tokens during each iteration.

In some implementations, the Transformer-based causal attention model may take the form of a decoder-only transformer. In some such implementations, audio input tokens from the incoming stream of audio input tokens may be mixed with audio output tokens predicted up to the current time step to generate a mixed stream of audio tokens. The mixed stream of audio tokens may be iteratively processed using the decoder-only transformer model. Audio input tokens and previously predicted audio output tokens may be mixed in various ways. In some implementations, audio input tokens may be interleaved with audio output tokens predicted up to the current time step, e.g., one after the other. In other implementations, difference mixes of audio input tokens and previously-predicted audio output tokens may be assembled, such as n-tuples (n being a positive integer) of audio input tokens interleaved with n-tuples of audio output tokens, n-tuples of audio input tokens interleaved with m-tuples (m being a positive integer different than n) of audio output tokens, and so forth.

In other implementations, the Transformer-based causal attention model may take the form of an encoder transformer and decoder transformer coupled via cross attention (e.g., using one or more cross attention layers). In some such implementations, the encoder transformer may attend to audio input tokens of the stream of audio input tokens. The decoder transformer may attend to audio output tokens of the stream of audio output tokens, as well as to the audio input tokens via the cross attention. In some implementations, one or more parameters of the encoder transformer, decoder transformer, and/or the cross attention mechanism may be adjusted to facilitate a controlled amount of lookahead, e.g., by enabling at least some non-causal "right" (i.e. lookahead) context. As with the decoder-only transformer, the encoder-decoder implementation may be configured with local attention, e.g., via one or more local attention kernels.

The audio input tokens may take various forms. One form of audio input token is an acoustic input token that is generated, for instance, using a neural audio codec. Acoustic input tokens (or more generally, any acoustic tokens) may be trained in such a way that it is possible to reconstruct the fine-level details of the underlying audio waveform. Another form of audio input token is a semantic token which is generated from an audio waveform using a semantic tokenizer. The semantic tokenizer may be trained to capture, in the audio input tokens, semantic features of the audio input frames. These semantic features may include, but are not limited to, features such as phonetic features of the audio input frames; prosodic features of the audio input frames; melodic features of the audio input frames; and/or rhythmic features of the audio input frames.

In some implementations, the audio input token stream may include both acoustic input token(s) and a semantic input token(s). Similarly each of the audio output tokens of the stream of audio output tokens may include both a predicted acoustic output token and a predicted semantic output token. In some implementations, the semantic input/output tokens may be used to drive downstream audio frame generation. For instance, when detokenizing an audio output token that includes both predicted acoustic output and semantic token(s), the aforementioned detokenizer may be configured to decode the predicted acoustic output token, without decoding the predicted semantic output token.

Techniques described herein are not limited to decoder-only or encoder-decoder architectures. It may be possible to use encoder-only architectures for tasks in which auto-regressive decoding is not necessarily required, e.g., because the input conditioning signal is temporally aligned with the target and contains sufficient information to almost deterministically reconstruct the target signal. One such example would be speech enhancement. In some such implementations, the tokenizer, detokenizer and encoder model may be causal and streamable as described previously. In some implementations, a controllable amount of lookahead may be added, e.g., by adjusting the right context of local attention to be non-zero in one (or more) of the encoder layers. Both the inputs and the targets can optionally be represented either as tokens or as continuous embeddings. Depending on the discrete/continuous nature of the targets, a different loss function can be adopted (e.g., regression loss for continuous targets vs. cross-entropy loss for discrete targets).

In some implementations, the tokenizer, Transformer-based causal attention model, and/or the detokenizer may be configured to use residual vector quantization (RVQ) in various numbers of layers to generate the audio input and/or output tokens. For example, a larger number of RVQ levels Q may be used in the acoustic generation stage to increase the bitrate and hence, the resulting sound quality. While it is possible to generate multiple RVQ levels with the same model, in some implementations, acoustic generation may be split into multiple stages. In one "coarse" stage, tokens may be generated up to a first level of quantization using a coarse RVQ model. In a subsequent "refinement" stage, a refinement RVQ model may be used to generate the next level(s) of quantization. Having multiple different stages of RVQ may optimize the use of computing resources, e.g., by using a larger model to predict coarse RVQ levels and a smaller model to predict "fine" RVQ levels.

Techniques described herein may give rise to various technical advantages, particularly in scenarios where there is a desire or need to process time-varying input to generate streaming output with low latency. For example, techniques described herein may facilitate real time or at least near real time speech-to-speech translation in which a source speech is translated to a target language. Rather than translating snippets of speech all at once, the translation can begin midstream so that the listener receives the translation more quickly. Another example is speech enhancement, wherein an input voice input is restored to improve intelligibility, e.g., in noisy environments and/or over spotty data connections. Rather than having to wait for the speaker to finish speaking the utterance before it is enhanced, the listener may hear enhanced speech while as the speaker is speaking it, enabling more natural conversation.

Another application is dialogue agents (sometimes referred to as "virtual assistants," "chatbots," etc.) in which a system is able to interact with the user via a speech-only interface. With conventional turn-based techniques, the speaker may issue their utterance, and then be required to wait some amount of time while it is processed before the dialogue agent responds. With techniques described herein, the dialogue agent's response may be closer to instantaneous, or the dialogue agent can give interactive feedback (e.g. backchanneling). Yet another application in which techniques described herein may be applied is controllable music generation, in which music is generated on-the-fly, based on a time-varying input. This time-varying input may assume various forms, such as melody (e.g., played using a midi keyboard), rhythm, chord progression, and so forth.

As used herein, an input "stream" refers to a logically and/or semantically self-contained sequence of digital information. It is not required that a stream of input is continuous or entirely uninterrupted. In some cases, an input stream can be derived and/or sampled from analog data such as a voltage waveform generated from sound waves, although this is not required. With conventional techniques, an entire (e.g., logically and/or semantically self-contained) stream of input would have been processed at once, e.g., after the whole stream was received. For example, a speaker's natural language request to a dialog agent may not be processed until they are finished speaking (having the entire context of the user's utterance can yield more accurate responses). By contrast, with techniques described herein, processing of the input stream begins while the user is still speaking. While this may result in slightly less context being available at any given moment, the tradeoff is a significant reduction in latency, which may be acceptable in various scenarios.

While examples described herein primarily relate to generating streaming audio output, this is not meant to be limiting. Techniques described herein may be applicable when the input is not represented by an audio signal, but by any arbitrary conditioning signal that is time-varying. In the case of speech, the conditioning signal could represent prosody-related features (e.g., pitch, energy, etc.). In the case of music, the conditioning signal could represent melody, rhythm, chord progressions, etc. In various implementations, the input conditioning signal may be converted into input tokens or, for encoder-decoder architectures, a continuous representation in the form of embeddings can be processed directly instead.

FIG. 1 is a schematic diagram illustrating components that can cooperate to carry out selected aspects of the present disclosure, in accordance with various implementations. The various components depicted in FIG. 1, particularly those components forming a streaming response system 100, may be implemented using any combination of hardware and software. The components of FIG. 1 are depicted as being communicatively coupled with each other via one or more networks 199, which may include one or more personal area networks, local area networks, and/or wide area networks (e.g., the Internet). However, this is not meant to be limiting. Various aspects of the present disclosure that are described as being performed by and/or stored on system 100 can alternatively be performed by and/or stored elsewhere and/or distributed across multiple systems, such as between system 100 and a client device 132.

In some implementations, streaming response system 100 may include one or more computing devices cooperating to perform selected aspects of the present disclosure. An example of such a computing device is depicted schematically in FIG. 8. In some implementations, streaming response system 100 may include one or more servers forming part of what is often referred to as a "cloud" infrastructure, or simply "the cloud." Alternatively, one or more components of system 100 may be operated by client device 132.

Streaming response system 100 may include an acoustic tokenizer 102, a semantic tokenizer 104, a streaming GM engine 106, and a streaming detokenizer 108. Any of elements 102-108 may be implemented using any combination of hardware and software. Moreover, any of elements 102-108 may be combined with other(s) of elements 102-108.

In various implementations, a user 130 may interact with streaming response system 100 using a client device 132. While depicted as a tablet computer or smart phone in FIG. 1, client device 132 may take other forms, such as a desktop or laptop computer, in-vehicle computing device, augmented reality (AR) and/or virtual reality (VR) headset or glasses, standalone "smart" speakers that host automated assistants, etc.

While shown as separate systems that communicate using network(s) 199, this is not meant to be limiting. Aspects of streaming response system 100 may be implemented in whole or in part on client device 132. For example, if a user wishes to translate an utterance spoken in English to Japanese, the user may wish the translation to occur with little latency, e.g., so that a listener is not required to wait for a translation. If client device 132 includes sufficient computing resources, and/or generative model(s) used to implement the translating can be made sufficiently "lean," it may be desirable to implement techniques described herein locally on client device 132 to avoid latency introduced by a round trip across network(s) 199.

In various implementations, a streaming digital input 110 may be obtained. In some implementations, streaming digital input 110 may be sampled from an analog waveform. In some implementations, the analog waveform may be a voltage waveform that is generated based on pressure waves captured by a microphone (integral with client device 132 or elsewhere).

In some such implementations, acoustic tokenizer 102 may include an encoder 112, residual vector quantization (RVQ) element 114, and a decoder 116. In various implementations, encoder 112 and/or decoder 116 may be Transformer-based, although this is not required. With these components, acoustic tokenizer 102 may be configured to process streaming digital input 110 to generate acoustic input tokens 118. The various pattern fills used with acoustic input tokens 118 in FIG. 1 are meant to represent various levels of RVQ applied by element 114. While three levels of RVQ are depicted in the figures, this is not meant to be limiting. Acoustic input tokens 118 (and other tokens described herein) may take various forms, such continuous vectors, embeddings, etc.

Semantic tokenizer 104 may be configured to process the same streaming digital input 110, e.g., in parallel with acoustic tokenizer 102, to generate semantic input tokens 124. In various implementations, semantic tokenizer 104 may be Transformer-based or otherwise, and may include one or more intermediate layers 120. In some such implementations, an intermediate layer 120 may be tapped to retrieve input for a K-means function 122. The output of the K-means function may be the semantic input tokens 124. In some implementations, semantic input tokens 124 generated by semantic tokenizer 104 may capture semantic features of the audio input frames. These semantic features of the audio input frames may include, for instance, features such as phonetic features of the audio input frames; prosodic features of the audio input frames; melodic features of the audio input frames; and/or rhythmic features of the audio input frames.

Streaming GM engine 106 may be configured to process acoustic input tokens 118 and/or semantic input tokens 124 using one or more GMs 107 to generate output tokens 126. GM(s) 107 described herein may take various forms, including, but not limited to "large language models" (LLMs) and/or other similar GMs such as PaLM, BERT, LaMDA, Meena, and/or any other generative model, such as any other generative model that is encoder-only based, decoder-only based, sequence-to-sequence based and that optionally includes an attention mechanism or other memory. Generative models may have hundreds of millions, or even hundreds of billions of parameters. In some implementations, generative models may include a multi-modal model such as a vision language model (VLM) and/or a visual question answering (VQA) model, which can have any of the aforementioned architectures, and which can be used to process multiple modalities of data, particularly images and text, and/or images and audio for example, to generate one or more modalities of output. Non-limiting examples of VLMs that may be applied as described herein include Gemini and/or Flamingo, to name a few.

Streaming detokenizer 108 may be configured to process (e.g., detokenize) output tokens 126 to generate a streaming digital output 128. Streaming digital output 128 may be used, e.g., by client device 132, to render audio output at one or more speakers (not depicted). Depending on the use case, streaming digital output 128 may represent (e.g., be rendered as), for instance, a translation of speech into a target language, other acoustic output (e.g., automatically generated background music, rhythm section, etc.), a response from a dialogue agent, enhanced speech in a noisy environment and/or over a poor connection, etc.

Figure 2A:
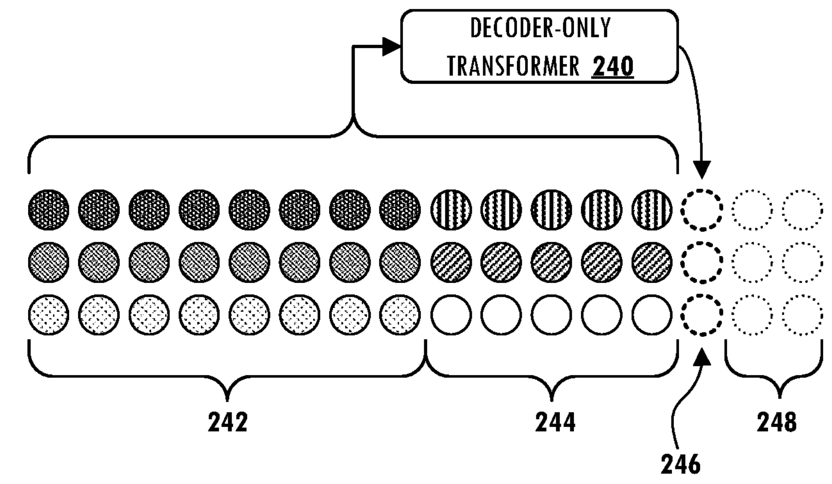
FIG. 2A and FIG. 2B depict examples of how a decoder-only transformer may be applied to generate streaming output, in accordance with various implementations.

Turning now to FIG. 2A, an example of a non-streaming architecture that is used to process acoustic input tokens (e.g., 118 in FIG. 1) is depicted. In this example, a decoder-only transformer 240 is used, e.g., by streaming GM engine 106 (not depicted), to process both input tokens 242 (which may share characteristics with acoustic input tokens 118 of FIG. 1) and already predicted output tokens 244 to predict a next output token 246. For instance, decoder-only transformer 240 may generate output tokens autoregressively using a full attention mechanism. In some implementations, the architecture of decoder-only transformer 240 may be designed to model the conditional distribution of a sequence of RVQ input tokens 242 tokens without resorting to flattening the sequence. In FIGS. 2A and B, the progressively darker (down to up) pattern fills correspond to different layers of RVQ. The dashed tokens 248 at right represent yet-to-be predicted output tokens.

A relatively large number of input tokens 242 are processed by decoder-only transformer 240 to predict the next output token 246. Put another way, decoder-only transformer 240 may have a relatively large context length. For example, the processed input tokens may include an entire logically and/or semantically self-contained streaming input, such as a natural language command or request from a user, an entire song's worth of melody, etc.

Figure 2B:
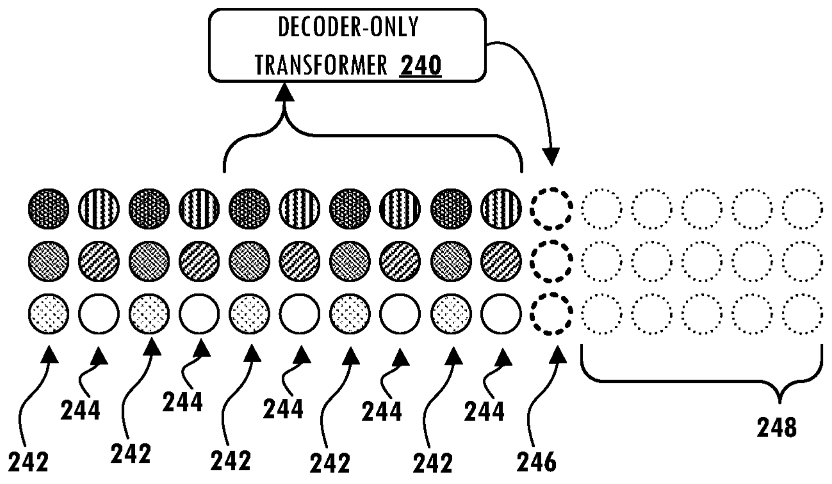

FIG. 2B schematically depicts an example of a non-streaming architecture. Decoder-only Transformer 240 is once again used, e.g., by streaming GM engine 106, to process both input tokens 242 and already predicted output tokens 244 to predict a next output token 246. The dashed tokens 248 at right once again represent yet-to-be predicted output tokens. However, in the example of FIG. 2B, decoder-only transformer 240 has a shorter context length than in FIG. 2A because it uses local attention (processes three input tokens 242 and three output tokens 244 in FIG. 2B), as opposed to full attention.

Moreover, rather than processing a successive number of input tokens 242 and a successive number of output tokens 244, decoder-only transformer 240 processes a mixed stream of input tokens 242 and output tokens 244. In FIG. 2B, for instance, individual input tokens 242 are interleaved with individual output tokens 244. In other implementations, other permutations may be used, such as two (or more) input tokens 242 interleaved with two (or more) output tokens 244. In yet other implementations, unequal numbers of input and output tokens may be shuffled into a mixed stream for processing by decoder-only based Transformer 240.

At inference time, in some implementations, decoding may be performed using decoder-only transformer 240 at time steps corresponding to the output tokens 244. In some such implementations, the input tokens 242 may be teacher forced rather than predicted. In some implementations, a context length of the local attention kernel of decoder-only transformer 240 to add a controllable lookahead, e.g., extra right/future context length, at the cost of potentially introducing latency.

At training time, the loss might be masked at time steps corresponding to the input tokens 242, since the input tokens 242 will not be predicted at inference time. However, in some implementations, loss may nonetheless be computed at all time steps to regularize decoder-only transformer 240. This may be particularly beneficial when training on relatively small datasets.

Figure 3A:
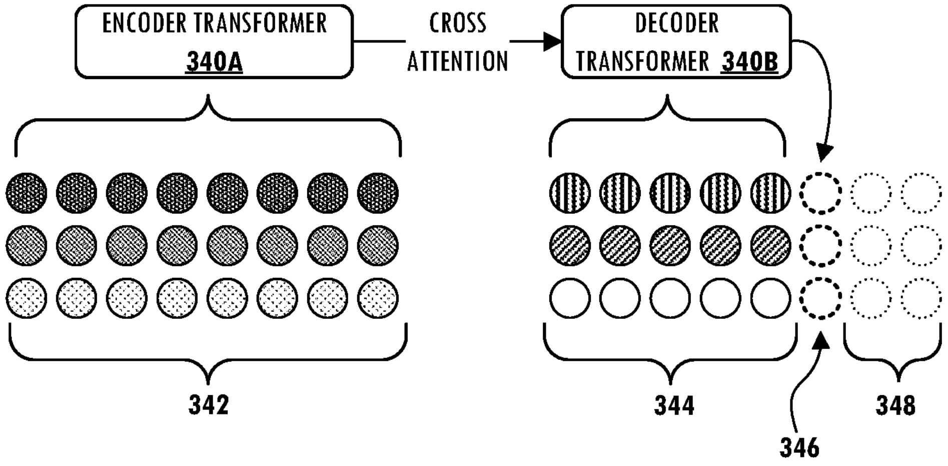
FIG. 3A and FIG. 3B depict examples of how an encoder transformer and a decoder transformer coupled via cross attention may be applied to generate streaming output, in accordance with various implementations.
Figure 3B:
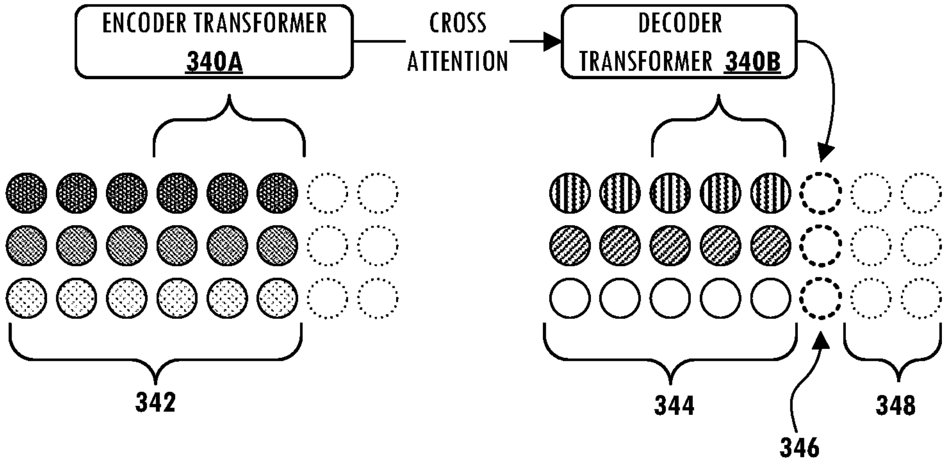

Techniques described herein are not limited to decoder-only architectures. FIGS. 3A and 3B depict examples in which an encoder transformer 340A and decoder transformer 340B are logically coupled via cross attention and are used to process acoustic input tokens (with the different pattern fills once again representing different RVQ levels). In FIG. 3A, which depicts a non-streaming architecture, encoder transformer 340A is used, e.g., by streaming GM engine 106, to process all available input tokens 342 as a self-contained stream of input, e.g., using full attention. Decoder Transformer 340B is used, e.g., by streaming GM engine 106, to attend across the input tokens and across all available output tokens 344 up to a current time step using the cross attention with encoder transformer 340A to predict the next output token 346. The dashed tokens 348 at right once again represent to-be-predicted output tokens.

FIG. 3B depicts a streaming encoder-decoder architecture. Encoder Transformer 340A and decoder transformer 340B are once again logically coupled via cross attention. Encoder Transformer 340A once again is used, e.g., by streaming GM engine 106, to process input tokens 342, except in this instance using a local attention kernel that imposes a constrained context length (three tokens in FIG. 3B compared to eight in FIG. 3A). In some implementations, streaming GM engine 106 may be restricted to applying encoder transformer 340A to process only those input tokens 342 that have arrived up to a current time, as well as those output tokens 344 that have already been predicted up to the current time.

Likewise, decoder transformer 340B once again is used, e.g., by streaming GM engine 106, to process output tokens 344 using the cross attention with encoder transformer 340A to predict the next output token 346. However, decoder transformer 340B uses local attention that constrains its context length. As before, in some implementations, context length(s) of encoder transformer 340A, decoder transformer 340B, and/or the cross attention that logically couples them may be adjusted to permit some lookahead, e.g., at the potential cost of introducing latency.

FIGS. 2A-B and 3A-B depict architectures operating on acoustic tokens, e.g., generated by acoustic tokenizer 102. However, this is not meant to be limiting. It should be understood that the architectures depicted in FIGS. 2A-B and 3A-B may also be used to process sequences of semantic tokens, in addition to or instead of acoustic tokens. If processing only semantic tokens, the main difference is the nature of the tokenizer, which would be the semantic tokenizer 104 depicted in FIG. 1. When simple vector quantization is used to produce semantic tokens, this corresponds to the case when Q=1.

Figure 4A:
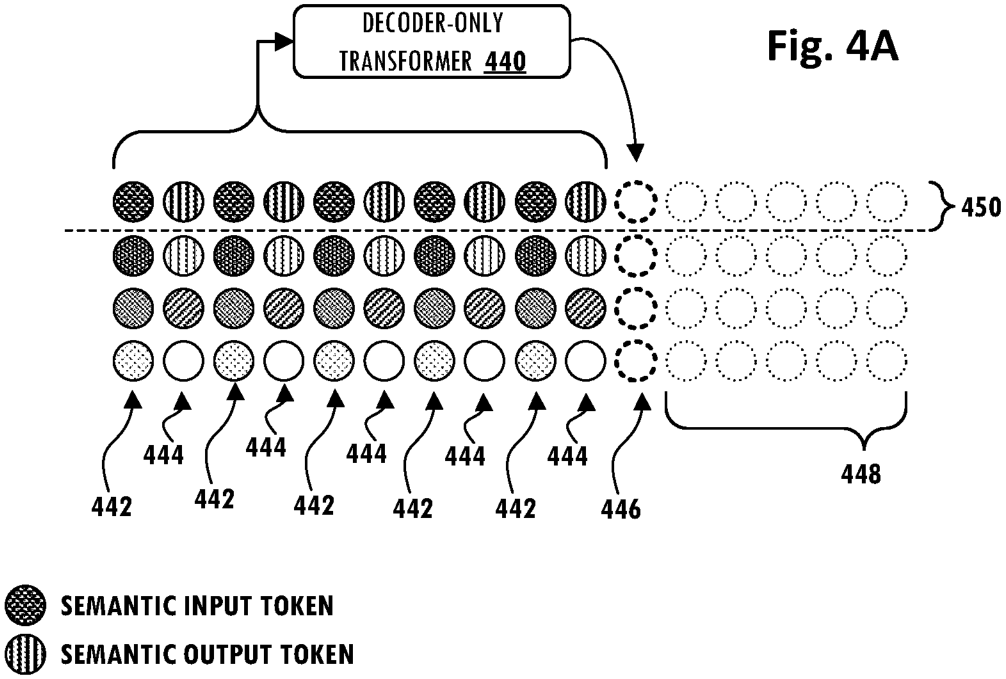
FIG. 4A and FIG. 4B depict examples of how various Transformers may be applied to both acoustic and semantic tokens to generate streaming output, in accordance with various implementations.

FIG. 4A depicts an example streaming architecture in which a decoder-only transformer 440, which may share various characteristics with decoder-only transformer 240, is used by streaming GM engine 106 to process an interleaved sequence of input tokens 442 and output tokens 444, similar to that depicted in FIG. 2B, to predict a next output token 446. However, in FIG. 4A, decoder-only transformer 440 also is used to process semantic tokens 450 generated by, for instance, semantic tokenizer 104 in FIG. 1. Consequently, output tokens 444 generated up to the current time all include, and the next output token 446 will include, both semantic tokens 450 and acoustic tokens (the circles beneath semantic tokens 450). As indicated by the legend, in FIGS.

4A and B, semantic input tokens have different pattern fills than predicted semantic output tokens.

Figure 4B:
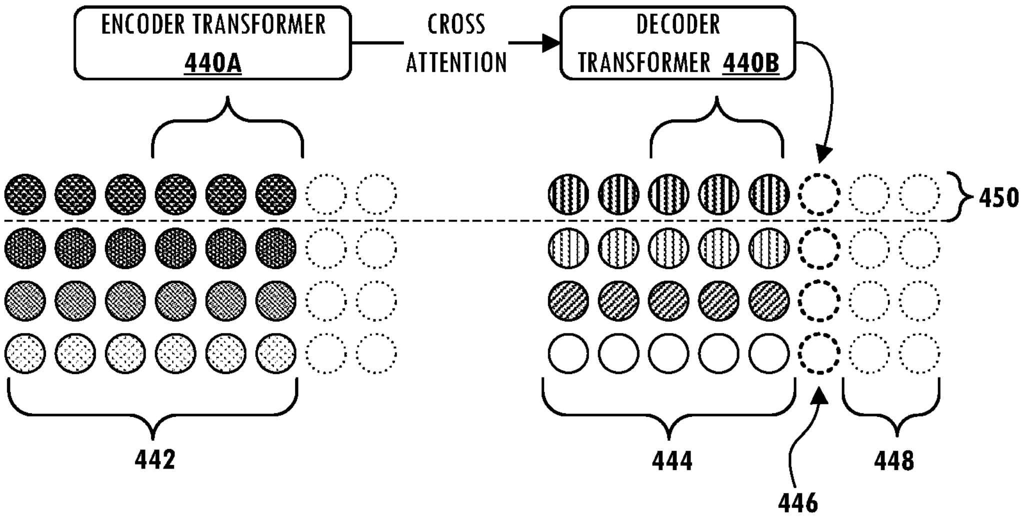

Similarly, FIG. 4B depicts an example encoder-decoder streaming architecture in which an encoder transformer 440A, which may share various characteristics with encoder transformer 340A, is used by streaming GM engine 106 to process input tokens 442. Encoder Transformer 440A is logically coupled with a decoder transformer 440B via cross attention, similar to FIG. 3B. Decoder Transformer 440 may be used by streaming GM engine 106 to attend across already-received input tokens 442 (via the cross attention) and across output tokens 444 predicted up to the current time, in order to predict a next output token 446. However, in FIG. 4B, encoder transformer 440A and decoder transformer 440B also are used to process semantic tokens 450 generated by, for instance, semantic tokenizer 104 in FIG. 1. Consequently, the next output token 446 and output tokens 444 generated up to the current time all include both semantic tokens 450 and acoustic tokens (the circles beneath semantic tokens 450).

To further illustrate these implementations, and referring to both FIGS. 1 and 4A-B, assume that streaming digital input 110 is fed into an input audio buffer. When a new frame with N samples is added to the input audio buffer, the following workflow may be implemented before and/or during a single inference step. For illustrative purposes, it will be assumed in this example that both acoustic and semantic tokens operate on frames of N samples.

Semantic tokenizer 104 may process the streaming digital input 110 to obtain new semantic input token(s) 124. Acoustic tokenizer may process the streaming digital input 110, e.g., in parallel with semantic tokenizer 104, to obtain new acoustic input token(s) 118/442. Then, the semantic and acoustic input tokens may be prepared for the inference step. If using a decoder-only transformer 240/440 as shown in FIGS. 2B and 4A, this preparation may include appending the new semantic and acoustic input tokens to the mixed (e.g., interleaved) sequence of tokens. If using an encoder-decoder architecture as shown in FIGS. 3B and 4B, this preparation may include appending both the newly obtained semantic and acoustic token(s) to inputs of the encoder transformer 340A/440A.

During the inference step, semantic output tokens and acoustic output tokens (e.g., both captured by 126 in FIG. 1) may be predicted/decoded, either by decoder-only transformer 240/440 or by decoder transformer 340B/440B. Then, streaming detokenizer 108 may be operated to decode N output samples (e.g., 128 in FIG. 1) from the semantic and acoustic output tokens.

Figure 5:
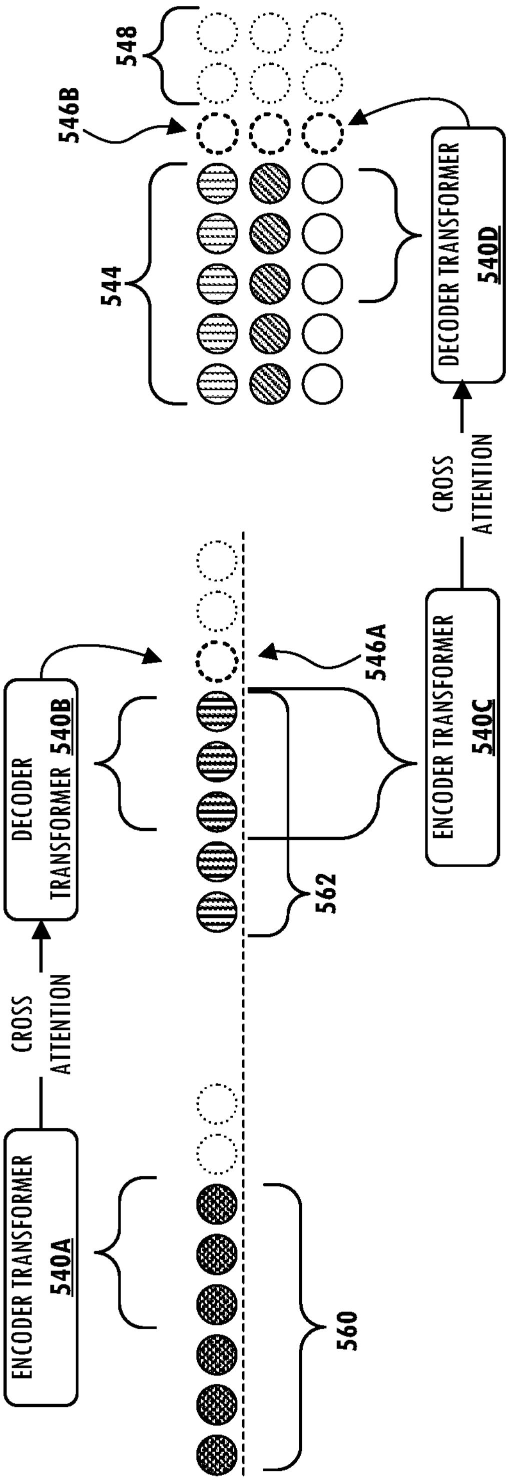
FIG. 5 depicts an example of how acoustic and semantic tokens may be processed in stages to generate streaming output, in accordance with various implementations.

FIG. 5 depicts an alternative implementation in which semantic and acoustic input tokens are processed in separate stages to generate acoustic output tokens (which can then be processed by streaming detokenizer 108 as explained previously). In a first stage, and starting at left, an encoder transformer 540A is coupled with a decoder transformer 540B via cross attention, similar to previous encoder-decoder architectures described herein. However, instead of processing both acoustic and semantic input tokens, in this example, encoder transformer 540A is used by streaming GM engine 106 to process exclusively semantic input tokens 560 that have been obtained up to a current time. Similarly, decoder transformer 540B is used by streaming GM engine 106 to process semantic output tokens 562 that have been predicted up to the current time, while cross attending across semantic input tokens 560, to predict a next semantic output token 546A.

In a second stage, another encoder transformer 540C, which is logically coupled with another decoder transformer 540D via cross attention, is used by streaming GM engine 106 to process at least some of the predicted semantic output tokens 562, e.g., via a local attention kernel. The additional decoder transformer 540D is used by streaming GM engine 106 to process acoustic output tokens 544 that have been predicted up to the current time, while cross attending across semantic output tokens 562, to predict a next acoustic output token 546B. A similar approach may be employed in the second stage using a decoder-only transformer, e.g., by mixing (e.g., interleaving) semantic input tokens 560 with semantic output tokens 562 predicted up to a current time.

It may be beneficial for acoustic tokenizer 102 to use multiple levels of RVQ levels Q in the acoustic input token generation stage. Doing so may increase the bitrate, and hence, the resulting quality of the streaming digital output 128. While it is possible to generate all RVQ levels with the same model, it might be beneficial to split acoustic generation into multiple (e.g., two) stages, with one initial RVQ model generating up to level Q' first, and then another RVQ refinement model generating the remaining Q-Q' levels. Using a larger model to predict the coarse RVQ levels and a smaller model to predict relatively fine RVQ levels may facilitate efficient use of computational resources.

Figure 6A:
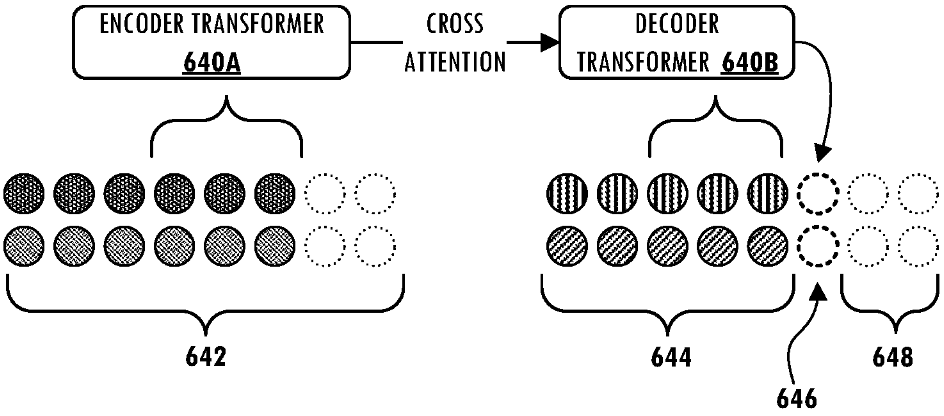
FIG. 6A and FIG. 6B schematically depict examples of how multiple levels of residual vector quantization (RVQ) may be applied to generate multiple stages of streaming acoustic at increasing levels of quality.
Figure 6B:
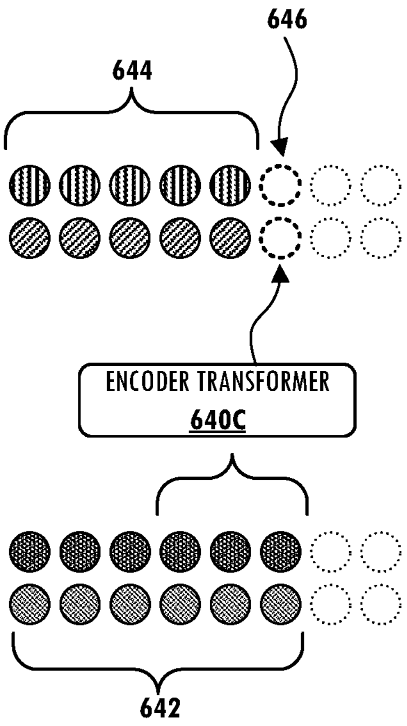

Examples of how multiple RVQ levels may be implemented to conserve computational resources are depicted in FIGS. 6A and 6B. In FIG. 6A, an encoder transformer 640A is logically coupled with a decoder transformer 640B via cross attention, similar to other implementations described herein. Encoder Transformer 640A may be used by streaming GM engine 106 to process coarse acoustic input tokens 642 (e.g., using local attention) that have been provided/received up to a current time. Decoder Transformer 640B may be used by streaming engine 106 to process (e.g., attend across) fine acoustic output tokens 644 that have been predicted up to the current time, as well as coarse acoustic input tokens 642, to predict a next fine acoustic output token 646. As before, reference numeral 648 represents acoustic output tokens to be predicted in subsequent iterations.

FIG. 6B depicts an encoder transformer 640C that may also have local attention. In various implementations, encoder transformer 640C may be used by streaming GM engine 106 to process coarse acoustic input tokens 642 to predict a next fine acoustic output token 646 in a sequence of fine acoustic output tokens 644. Note that in either of the implementations of FIGS. 6A-B, tokens can be replaced with continuous embeddings.

Figure 7:
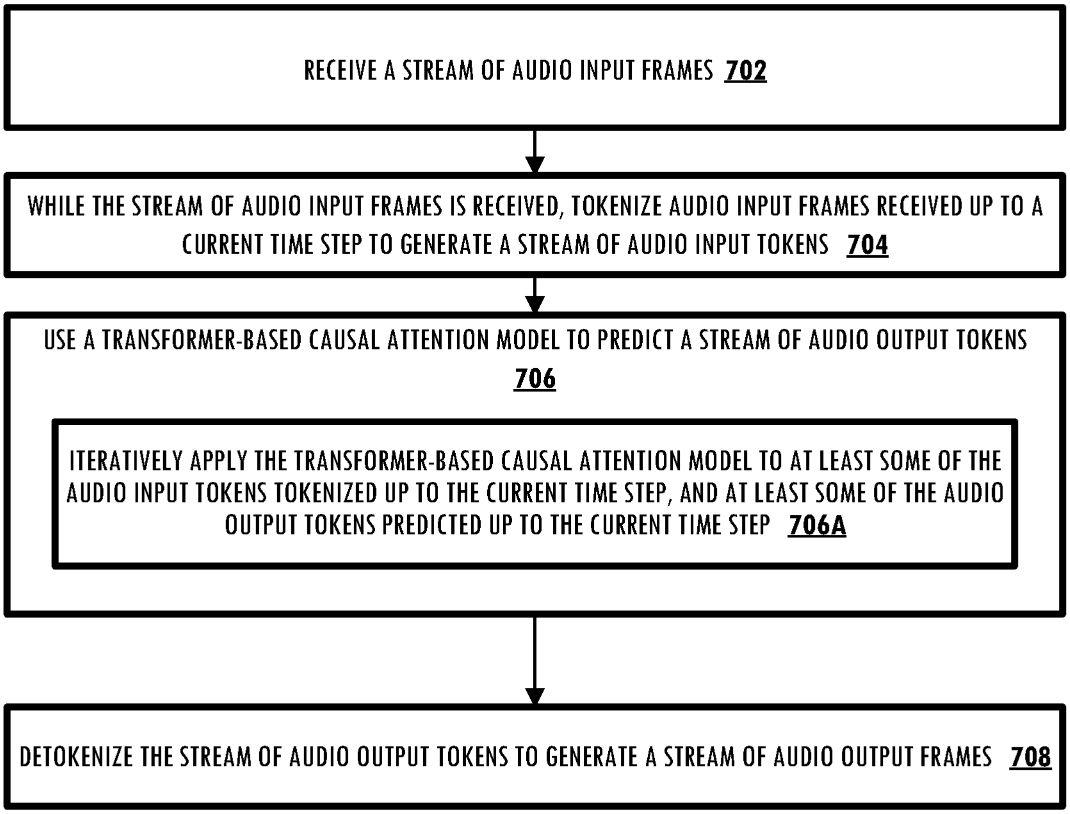
FIG. 7 depicts an example method for practicing selected aspects of the present disclosure.

Referring now to FIG. 7, an example method 700 of practicing selected aspects of the present disclosure is described. For convenience, the operations of the flowchart are described with reference to a system that performs the operations. This system may include various components of various computer systems, including those depicted in FIG. 1. Moreover, while operations of method 700 are shown in a particular order, this is not meant to be limiting. One or more operations may be reordered, omitted or added.

At block 702, the system may receive a stream of audio input frames (e.g., streaming digital input 110). While the stream of audio input frames continues to be received, at block 704, audio input frames received up to a current time step may be tokenized midstream, e.g., by acoustic tokenizer 102 and/or semantic tokenizer 104, to generate a stream of audio input tokens (e.g., 118, 124, 242, 342, 442, 560, 642). This stream of audio input tokens may include, for example, acoustic input tokens generated by acoustic tokenizer 102 and/or semantic tokens generated by semantic tokenizer

104. In some implementations, the acoustic input tokens generated by acoustic tokenizer 102 may be generated using a neural audio codec (e.g., as part of acoustic tokenizer 102).

At block 706, the system, e.g., by way of streaming GM engine 106, may use a Transformer-based causal attention model (e.g., 107, 240, 340A-B, 440, 440A-B, 540A-D, 640A-C) to predict a stream of audio output tokens (e.g., 126, 244, 344, 444, 544, 644). At part of this process, in some implementations, at block 706A, streaming GM engine 106 may iteratively apply the Transformer-based causal attention model to: at least some of the audio input tokens tokenized up to the current time step, and at least some of the audio output tokens predicted up to the current time step. In some implementations, during each iteration, the Transformer-based causal attention model is applied by streaming GM engine 106 to: (i) a current audio state that was generated autoregressively based on one or more prior iterations of the Transformer-based causal attention model to prior audio input tokens; and (ii) one or more next audio input tokens.

At block 708, the system, e.g., by way of streaming detokenizer 108, may detokenize the stream of audio output tokens to generate a stream of audio output frames (e.g., 128 in FIG. 1). This stream of audio output frames may be rendered, e.g., by client device 132 using one or more speakers (not depicted), as audio output that can be perceived audibly. In some implementations in which both acoustic and semantic tokens are processed/predicted, the detokenizing of block 708 may include decoding predicted acoustic output token(s), without decoding predicted semantic output token(s).

Figure 8:
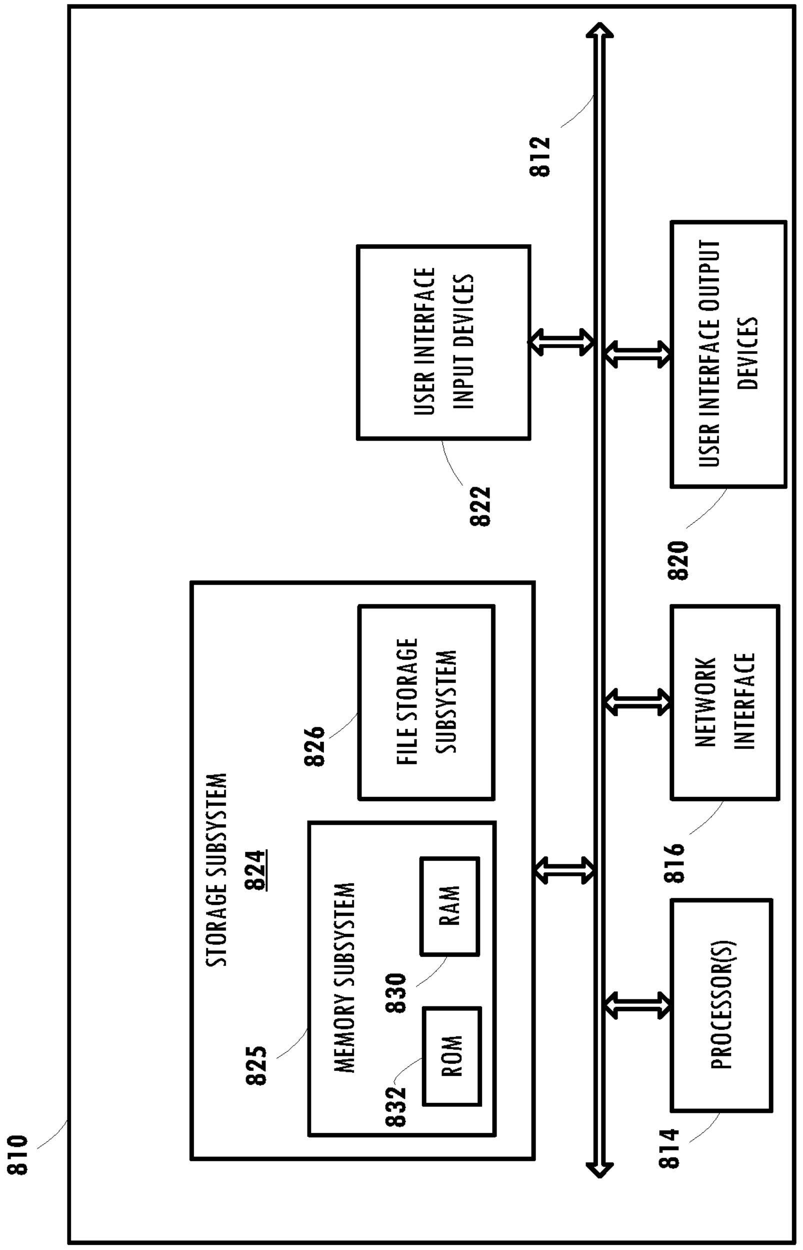
FIG. 8 schematically depicts an example architecture of a computer system.

FIG. 8 is a block diagram of an example computer system 810. Computer system 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 may include the logic to perform selected aspects of method 700, and/or to implement one or more aspects of the various components depicted in FIG. 1. Memory 825 used in the storage subsystem 824 can include a number of memories including a main random-access memory (RAM) 830 for storage of instructions and data during program execution and a read only memory (ROM) 832 in which fixed instructions are stored. A file storage subsystem 826 can provide persistent storage for program and data files, and may include a hard disk drive, a CD-ROM drive, an optical drive, or removable media cartridges. Modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple buses.

Computer system 810 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:

receiving a stream of audio input frames;

while the stream of audio input frames is received, tokenizing audio input frames received up to a current time step to generate a stream of audio input tokens;

using a Transformer-based causal attention model to predict a stream of audio output tokens, wherein using the Transformer-based causal attention model comprises iteratively applying the Transformer-based causal attention model to:

at least some of the audio input tokens tokenized up to the current time step, and at least some of the audio output tokens predicted up to the current time step;

detokenizing the stream of audio output tokens to generate a stream of audio output frames; and causing the stream of audio output frames to be rendered using one or more speakers to generate audio output that is perceptible audibly.

2. The method of claim 1, further comprising mixing audio input tokens of the stream of audio input tokens with at least some of the audio output tokens predicted up to the current time step to generate a mixed stream of audio tokens.

3. The method of claim 2, wherein the mixed stream of audio tokens is iteratively processed using the Transformer-based causal attention model.

4. The method of claim 3, wherein the mixing comprises interleaving audio input tokens of the stream of audio input tokens with at least some of the audio output tokens predicted up to the current time step.

5. The method of claim 3, wherein the Transformer-based causal attention model comprises a decoder-only transformer.

6. The method of claim 1, wherein the Transformer-based causal attention model comprises an encoder transformer and a decoder transformer operably coupled using cross attention.

7. The method of claim 6, wherein the decoder transformer attends to audio output tokens of the stream of audio output tokens.

8. The method of claim 7, wherein the encoder transformer attends to audio input tokens of the stream of audio input tokens.

9. The method of claim 1, wherein the Transformer-based causal attention model uses local attention.

10. The method of claim 9, further comprising adjusting a future context length of the local attention to add a controllable lookahead.

11. The method of claim 1, wherein the stream of audio input tokens includes at least some acoustic input tokens generated using a neural audio codec.

12. The method of claim 11, wherein the stream of audio input tokens further includes at least some semantic input tokens generated using a semantic tokenizer that is trained to capture, in the audio input tokens, semantic features of the audio input frames.

13. The method of claim 12, wherein each of the audio input tokens comprises both an acoustic input token and a semantic input token.

14. The method of claim 13, wherein each of the audio output tokens comprises both a predicted acoustic output token and a predicted semantic output token, and wherein the detokenizing comprises decoding the predicted acoustic output token, without decoding the predicted semantic output token.

15. The method of claim 1, wherein the Transformer-based causal attention model comprises a first model used to process the at least some of the audio input tokens tokenized up to the current time step and at least some of the audio output tokens predicted up to the current time step to generate coarse acoustic tokens, and a second model to process the coarse acoustic tokens to generate fine acoustic tokens.

16. The method of claim 12, wherein the semantic features include one or more of:

phonetic features of the audio input frames;

prosodic features of the audio input frames;

melodic features of the audio input frames; or rhythmic features of the audio input frames.

17. The method of claim 1, wherein during each iteration of the Transformer-based causal attention model, the Transformer-based causal attention model is applied to:

a current audio state, wherein the current audio state was generated autoregressively based on one or more prior iterations of the Transformer-based causal attention model to prior audio input tokens; and one or more next audio input tokens.

18. A system comprising one or more processors and memory storing instructions that, in response to execution by the one or more processors, cause the one or more processors to:

receive a stream of audio input frames;

while the stream of audio input frames is received, tokenize audio input frames received up to a current time step to generate a stream of audio input tokens;

use a Transformer-based causal attention model to predict a stream of audio output tokens, wherein the instructions to use the Transformer-based causal attention model include instructions to iteratively apply the Transformer-based causal attention model to:

at least some of the audio input tokens tokenized up to the current time step, and at least some of the audio output tokens predicted up to the current time step;

detokenize the stream of audio output tokens to generate a stream of audio output frames; and cause the stream of audio output frames to be rendered using one or more speakers to generate audio output that is perceptible audibly.

19. The system of claim 18, further comprising instructions to mix audio input tokens of the stream of audio input tokens with at least some of the audio output tokens predicted up to the current time step to generate a mixed stream of audio tokens.

20. At least one non-transitory computer-readable medium comprising instructions that, in response to execution by one or more processors, cause the one or more processors to:

receive a stream of audio input frames;

while the stream of audio input frames is received, tokenize audio input frames received up to a current time step to generate a stream of audio input tokens;

use a Transformer-based causal attention model to predict a stream of audio output tokens, wherein the instructions to use the Transformer-based causal attention model include instructions to iteratively apply the Transformer-based causal attention model to:

at least some of the audio input tokens tokenized up to the current time step, and at least some of the audio output tokens predicted up to the current time step;

detokenize the stream of audio output tokens to generate a stream of audio output frames; and cause the stream of audio output frames to be rendered using one or more speakers to generate audio output that is perceptible audibly.

* * * * *